US009241231B2

(12) United States Patent
Osada

(10) Patent No.: US 9,241,231 B2
(45) Date of Patent: Jan. 19, 2016

(54) INFORMATION PROCESSING SYSTEM, COMPUTER-READABLE NON-TRANSITORY STORAGE MEDIUM HAVING STORED THEREIN INFORMATION PROCESSING PROGRAM, INFORMATION PROCESSING CONTROL METHOD, AND INFORMATION PROCESSING APPARATUS

(71) Applicant: NINTENDO CO., LTD., Kyoto (JP)

(72) Inventor: Junya Osada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 372 days.

(21) Appl. No.: 13/867,469

(22) Filed: Apr. 22, 2013

(65) Prior Publication Data
US 2014/0119580 A1 May 1, 2014

(30) Foreign Application Priority Data

Oct. 29, 2012 (JP) ................................ 2012-237973

(51) Int. Cl.
| H04R 5/02 | (2006.01) |
| H04S 7/00 | (2006.01) |
| A63F 13/90 | (2014.01) |
| A63F 13/92 | (2014.01) |
| A63F 13/54 | (2014.01) |
| A63F 13/57 | (2014.01) |

(52) U.S. Cl.
CPC ................. *H04S 7/303* (2013.01); *A63F 13/54* (2014.09); *A63F 13/90* (2014.09); *A63F 13/92* (2014.09); *A63F 13/57* (2014.09); *H04R 2499/11* (2013.01); *H04S 2400/11* (2013.01)

(58) Field of Classification Search
USPC ........... 381/1, 17, 18, 61, 300, 306, 307, 310; 700/94
See application file for complete search history.

(56) References Cited

U.S. PATENT DOCUMENTS

| 7,146,296 | B1 * | 12/2006 | Carlbom et al. | 703/5 |
| 2001/0011993 | A1 * | 8/2001 | Saarinen | 345/156 |

(Continued)

FOREIGN PATENT DOCUMENTS

JP  2012-135337  7/2012

OTHER PUBLICATIONS

United States Patent and Trademark Office, "Non-Final Office Action," issued in connection with U.S. Appl. No. 13/867,509, dated Jul. 16, 2015, 15 pages.

(Continued)

*Primary Examiner* — Vivian Chin
*Assistant Examiner* — Friedrich W Fahnert
(74) *Attorney, Agent, or Firm* — Nixon & Vanderhye, P.C.

(57) ABSTRACT

In an exemplary information processing system including an information processing section, a first loudspeaker, and a second loudspeaker, predetermined music data composed of two channels is separated into first channel music data and second channel music data. A first sound source object associated with one of the first channel music data and the second channel music data, a second sound source object associated with the other one, and a virtual microphone are placed in a virtual 3-dimensional space. The reproduction volume of a sound reproduced from the first loudspeaker, and the reproduction volume of a sound reproduced from the second loudspeaker are determined based on the direction of the virtual microphone and the positional relationship between the virtual microphone and each of the first sound source object and the second sound source object.

11 Claims, 14 Drawing Sheets

(56) References Cited

U.S. PATENT DOCUMENTS

| | | |
|---|---|---|
| 2004/0111171 A1* | 6/2004 | Jang et al. .................. 700/94 |
| 2009/0282335 A1* | 11/2009 | Alexandersson ............ 715/716 |
| 2010/0169103 A1* | 7/2010 | Pulkki ......................... 704/500 |
| 2011/0138991 A1 | 6/2011 | Tsuchida |
| 2012/0002024 A1* | 1/2012 | Choi et al. ................... 348/54 |
| 2012/0114153 A1* | 5/2012 | Yoo et al. .................... 381/303 |
| 2012/0165095 A1 | 6/2012 | Sato et al. |
| 2013/0010969 A1* | 1/2013 | Cho et al. .................... 381/17 |
| 2013/0123962 A1* | 5/2013 | Mizuta ......................... 700/94 |
| 2013/0225305 A1 | 8/2013 | Yang et al. |
| 2013/0279706 A1* | 10/2013 | Marti ........................... 381/57 |

OTHER PUBLICATIONS

U.S. Appl. No. 13/867,509, filed Apr. 22, 2013.

* cited by examiner

VIRTUAL SPACE
COORDINATE SYSTEM

TERMINAL DEVICE
COORDINATE SYSTEM
(VIRTUAL MICROPHONE
COORDINATE SYSTEM)

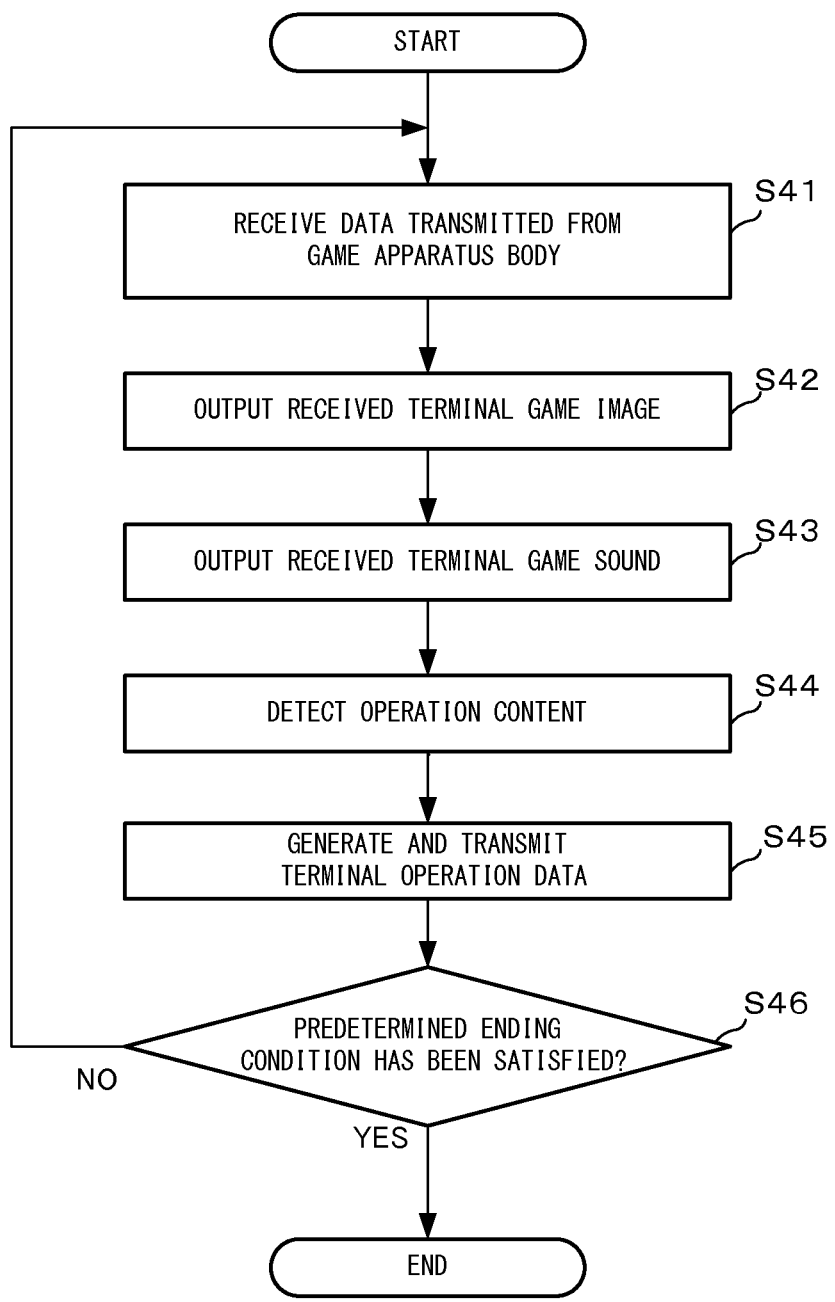

INFORMATION PROCESSING SYSTEM, COMPUTER-READABLE NON-TRANSITORY STORAGE MEDIUM HAVING STORED THEREIN INFORMATION PROCESSING PROGRAM, INFORMATION PROCESSING CONTROL METHOD, AND INFORMATION PROCESSING APPARATUS

CROSS REFERENCE TO RELATED APPLICATION

The disclosure of Japanese Patent Application No. 2012-237973, filed on Oct. 29, 2012, is incorporated herein by reference.

FIELD

The exemplary embodiments disclosed herein relate to an information processing system, a computer-readable non-transitory storage medium having stored therein an information processing program, an information processing control method, and an information processing apparatus, and more particularly, to an information processing system, a computer-readable non-transitory storage medium having stored therein an information processing program, an information processing control method, and an information processing apparatus, that include an information processing section, a first loudspeaker, and a second loudspeaker.

BACKGROUND AND SUMMARY

Conventionally, a game system is known that uses, in combination, a general television apparatus (first video output apparatus) and a controller (second video output apparatus) having a display section capable of outputting video which is provided separately from the television apparatus. In such a game system, for example, a first game video is displayed on the television apparatus, and a second game video different from the first game video is displayed on the display section of the controller, thereby proposing a new pleasure.

However, the above proposal does not focus on what video to display mainly or how to associate these videos with game processing upon displaying them. Therefore, the proposal does not particularly mention or suggest processing relevant to sound.

Therefore, the exemplary embodiments are to describe an information processing system, a computer-readable non-transitory storage medium having stored therein an information processing program, an information processing control method, and an information processing apparatus, that can provide a new experience giving a user a visual and audio effect with an enhanced realistic sensation, with respect to music reproduced from a sound source in virtual space. It is noted that, as used herein, the computer readable storage medium may include, for example, a magnetic medium such as flash memory, ROM, RAM, or an optical medium such as CD-ROM, DVD-ROM, or DVD-RAM.

The above feature can be achieved by the following configurations, for example.

As an exemplary configuration, an information processing system including an information processing section, a first speaker, and a second speaker will be shown. The information processing system includes a music data separating section, a sound source object placing section, a virtual microphone placing section, and a sound output control section. The music data separating section separates predetermined music data composed of two channels into first channel music data and second channel music data. The sound source object placing section places a first sound source object associated with one of the first channel music data and the second channel music data, and a second sound source object associated with the other one of the first channel music data and the second channel music data, at respective different positions in a virtual 3-dimensional space. The virtual microphone placing section places a virtual microphone at a predetermined position in the virtual 3-dimensional space. The sound output control section determines the reproduction volume of the first channel music data and the second channel music data reproduced from the first loudspeaker, and the reproduction volume of the first channel music data and the second channel music data reproduced from the second loudspeaker, based on the direction of the virtual microphone placed in the virtual 3-dimensional space and the positional relationship between the virtual microphone and each of the first sound source object and the second sound source object placed in the virtual 3-dimensional space.

According to the above exemplary configuration, it becomes possible to provide an experience with an enhanced realistic sensation to a user, with respect to reproduction of a BGM emitted from a sound source in a virtual space.

The information processing system may further include a first output apparatus, an orientation detection section, and a virtual microphone orientation changing section. The first output apparatus may have a housing provided with a motion sensor, the first loudspeaker, the second loudspeaker, and a first display section on which the virtual 3-dimensional space is displayed. The orientation detection section may detect the orientation of the first output apparatus based on output from the motion sensor in real time or substantially in real time. The virtual microphone orientation changing section may change the direction of the virtual microphone in accordance with the orientation of the first output apparatus.

According to the above exemplary configuration, in a game or the like in which a player changes the orientation of the first output apparatus having two loudspeakers and thereby display of the virtual space on the first display section is changed, a BGM emitted from a sound source object can be reproduced with an enhanced realistic sensation.

The information processing system may further include a loudspeaker position relationship recognizing section configured to recognize the positional relationship between the first loudspeaker and the second loudspeaker based on the orientation of the first output apparatus. The sound output control section may determine the reproduction volume of the first channel music data and the second channel music data outputted from the first loudspeaker, and the reproduction volume of the first channel music data and the second channel music data outputted from the second loudspeaker, based on the positional relationship between the first loudspeaker and the second loudspeaker as well as on the direction of the virtual microphone placed in the virtual 3-dimensional space and the positional relationship between the virtual microphone and each of the first sound source object and the second sound source object placed in the virtual 3-dimensional space.

According to the above exemplary configuration, a sound emitted by the sound source object in the virtual space can be expressed such that the positional relationship between loudspeakers in the real world is reflected in the sound.

The information processing system may further include a second output apparatus having a third loudspeaker, a fourth loudspeaker, and a second display section. The sound output control section may determine the reproduction volume of each loudspeaker based on the positional relationship among the first loudspeaker and the second loudspeaker of the first output apparatus, and the third loudspeaker and the fourth loudspeaker of the second output apparatus.

According to the above exemplary configuration, it becomes possible to perform sound output with an enhanced realistic sensation by using a first pair of loudspeakers of the first output apparatus which can be used as a game controller, and a second pair of loudspeakers of the second output apparatus which can be used as a monitor, for example. For example, sound output with respect to the up-down direction as seen from a player is assigned to the loudspeakers of the first output apparatus, and sound output with respect to the right-left direction as seen from the player is assigned to the loudspeakers of the second output apparatus, whereby the player can feel the presence of the virtual space, that is, feel a spatial sense.

The music data may be stereo music data composed of two channels. The first loudspeaker and the second loudspeaker may be a pair of stereo speakers.

According to the above exemplary configuration, music emitted from the sound source objects placed along the right-left direction in the virtual space can be expressed with an enhanced realistic sensation without causing a player to feel strangeness.

According to the exemplary embodiments, it becomes possible to perform sound output with an enhanced realistic sensation, with respect to a sound emitted by a sound source object present in a virtual space.

BRIEF DESCRIPTION OF THE DRAWINGS

FIG. 18 is a non-limiting exemplary flowchart showing the flow of control processing for the terminal device 6.

DETAILED DESCRIPTION OF NON-LIMITING EXAMPLE EMBODIMENTS

Figure 1:
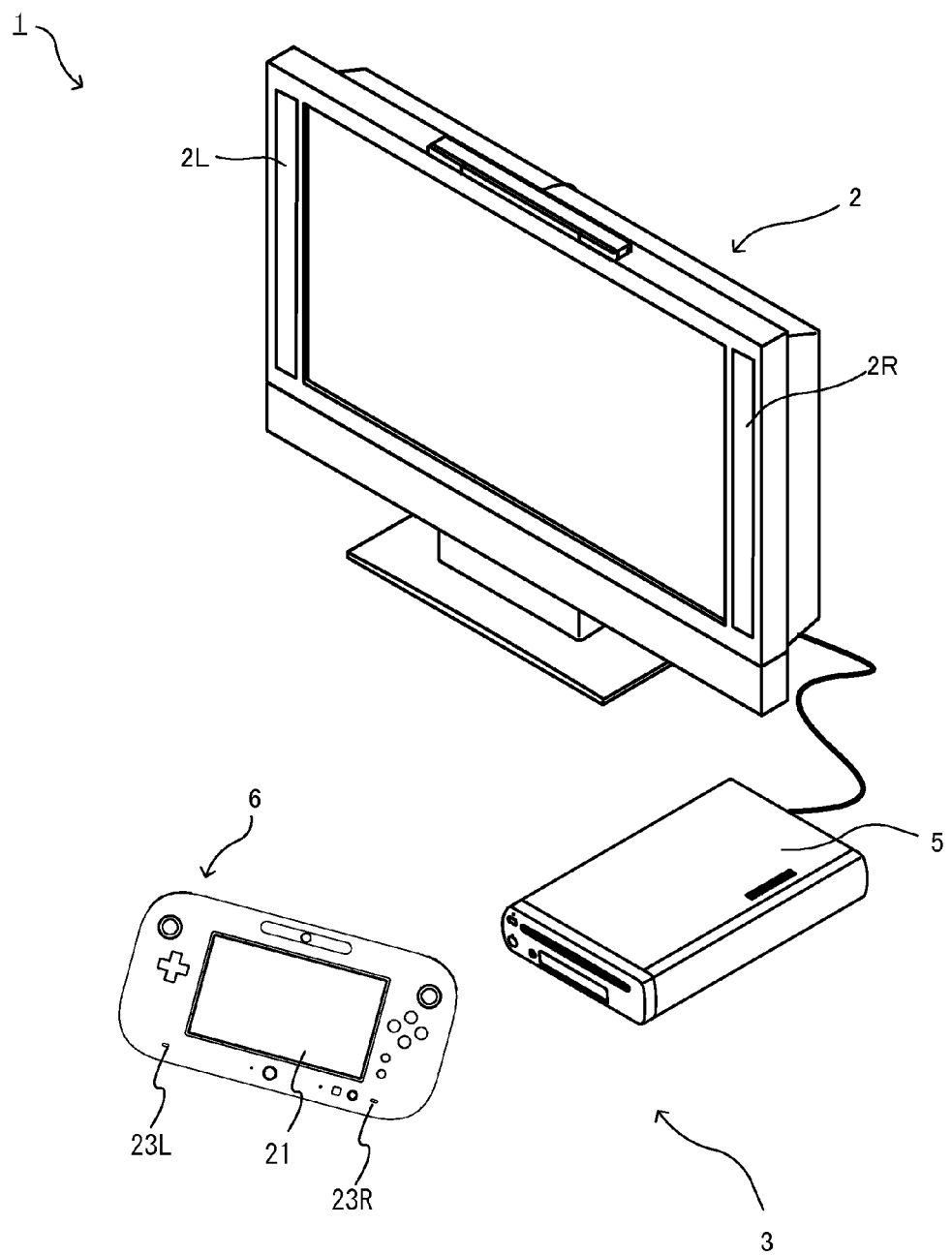
FIG. 1 is an external view showing a non-limiting example of a game system 1 according to an exemplary embodiment of the present disclosure.

With reference to FIG. 1, a game system according to an exemplary embodiment will be described.

As shown in FIG. 1, a game system 1 includes a household television receiver (hereinafter, referred to as a monitor) 2 that is an example of display section, and a stationary game apparatus 3 connected to the monitor 2 via a connection cord. The monitor 2 includes loudspeakers 2L and 2R which are stereo speakers having two channels. The game apparatus 3 includes a game apparatus body 5, and a terminal device 6.

The monitor 2 displays a game image outputted from the game apparatus body 5. The monitor 2 has the loudspeaker 2L at the left and the loudspeaker 2R at the right. The loudspeakers 2L and 2R each output a game sound outputted from the game apparatus body 5. In this exemplary embodiment, the monitor 2 includes these loudspeakers. Instead, external loudspeakers may be additionally connected to the monitor 2.

The game apparatus body 5 executes game processing and the like based on a game program or the like stored in an optical disc that is readable by the game apparatus body 5.

The terminal device 6 is an input device that is small enough to be held by a user. The user is allowed to move the terminal device 6 with hands, or place the terminal device 6 at any location. The terminal device 6 includes an LCD (Liquid Crystal Display) 21 as display section, loudspeakers 23L and 23R (hereinafter, may be collectively referred to as loudspeakers 23) which are stereo speakers having two channels, a headphone jack described later, input section (analog sticks, press-type buttons, a touch panel, and the like), and the like. The terminal device 6 and the game apparatus body 5 are communicable with each other wirelessly (or via a cable). The terminal device 6 receives, from the game apparatus body 5, data of an image (e.g., a game image) generated in the game apparatus body 5, and displays the image represented by the data on the LCD 21. Further, the terminal device 6 receives, from the game apparatus body 5, data of a sound (e.g., a sound effect, BGM or the like of a game) generated in the game apparatus body 5, and outputs the sound represented by the data from the loudspeakers 23. Further, the terminal device 6 transmits, to the game apparatus body 5, operation data representing the content of an operation performed on the terminal device 6.

Figure 2:
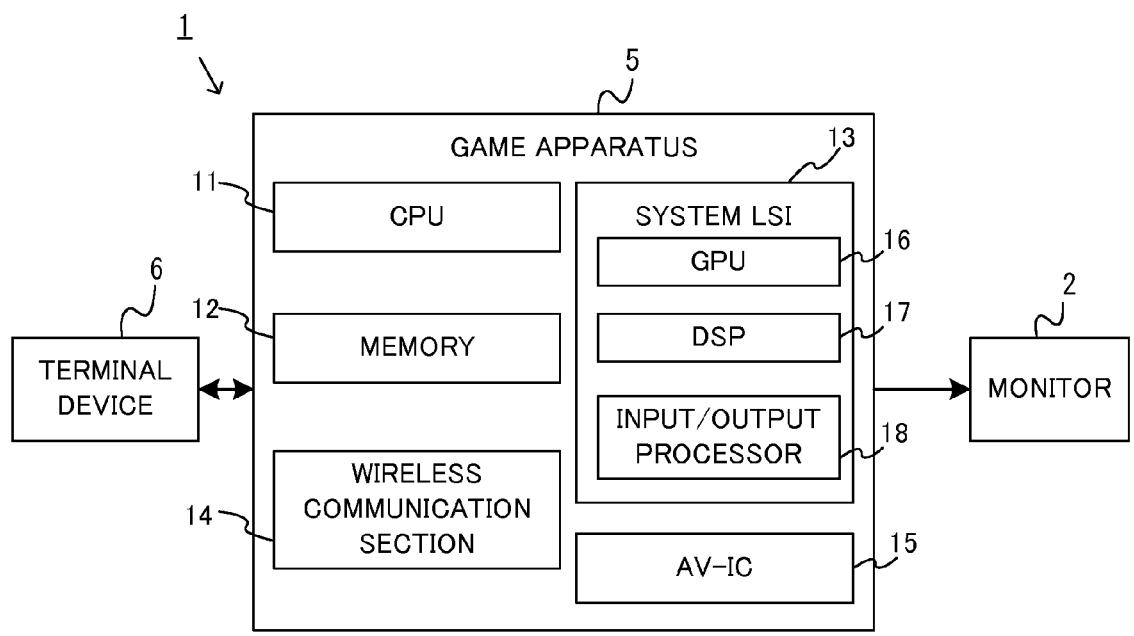
FIG. 2 is a function block diagram showing a non-limiting example of a game apparatus body 5 shown in FIG. 1.

FIG. 2 is a block diagram illustrating the game apparatus body 5. In FIG. 2, the game apparatus body 5 is an example of an information processing apparatus. In the exemplary embodiment, the game apparatus body 5 includes a CPU (control section) 11, a memory 12, a system LSI 13, a wireless communication section 14, and an AV-IC (Audio Video-Integrated Circuit) 15, and the like.

The CPU 11 executes a predetermined information processing program by using the memory 12, the system LSI 13, and the like. Thereby, various functions (e.g., game processing) in the game apparatus 3 are realized.

The system LSI 13 includes a GPU (Graphics Processor Unit) 16, a DSP (Digital Signal Processor) 17, an input/output processor 18, and the like.

The GPU 16 generates an image in accordance with a graphics command (draw command) from the CPU 11. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image", and the game image to be displayed on the terminal device 6 may be referred to as a "terminal game image".

The DSP 17 serves as an audio processor, and generates sound data by using sound data and sound waveform (tone quality) data stored in the memory 12. In the exemplary embodiment, similarly to the game images, both a game sound to be output from the loudspeakers 2L and 2R of the monitor 2 and a game sound to be output from the loudspeakers 23 of the terminal device 6 (or a headphone connected to the terminal device 6) may be generated. Hereinafter, the game sound to be output from the monitor 2 may be referred to as a "monitor game sound", and the game sound to be output from the terminal device 6 may be referred to as a "terminal game sound".

The input/output processor 18 executes transmission and reception of data with the terminal device 6 via the wireless communication section 14. In the exemplary embodiment, the input/output processor 18 transmits data of the game image (terminal game image) generated by the GPU 16 and data of the game sound (terminal game sound) generated by the DSP 17, via the wireless communication section 14 to the terminal device 6. At this time, the terminal game image may be compressed and transmitted so as to avoid a delay in the display image. In addition, the input/output processor 18 receives, via the wireless communication section 14, operation data and the like transmitted from the terminal device 6, and (temporarily) stores the data in a buffer region of the memory 12.

Of the images and sounds generated in the game apparatus body 5, the image data and sound data to be output to the monitor 2 are read by the AV-IC 15. Through an AV connector that is not shown, the AV-IC 15 outputs the read image data to the monitor 2, and outputs the read sound data to the loudspeakers 2a included in the monitor 2. Thereby, an image is displayed on the monitor 2, and a sound is output from the loudspeakers 2a.

Figure 3:
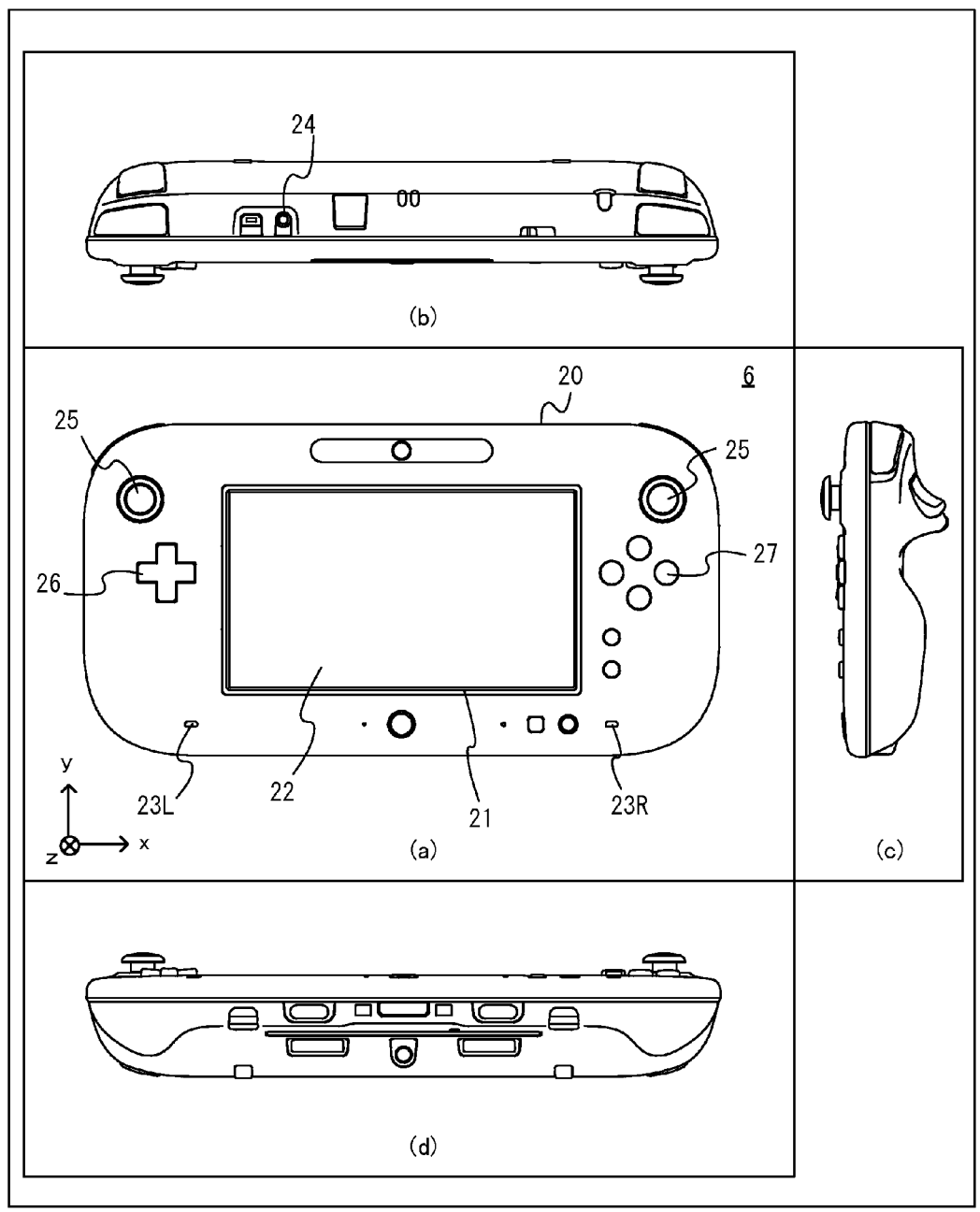
FIG. 3 is a diagram showing a non-limiting example of the external structure of a terminal device 6 shown in FIG. 1.

FIG. 3 is a diagram illustrating an example of an external structure of the terminal device 6. As shown in FIG. 3, the terminal device 6 includes a substantially plate-shaped housing 20. The size (shape) of the housing 20 is small enough to be held by a user with both hands or one hand. Further, the terminal device 6 includes an LCD 21 as an example of a display section. The above-mentioned terminal game image is displayed on the LCD 21.

The terminal device 6 includes the loudspeakers 23. The loudspeakers 23 are stereo speakers. The above-mentioned terminal game sound is outputted from the loudspeakers 23. In addition, the terminal device 6 includes a headphone jack 24 which allows a predetermined headphone to be attached and detached. Here, if a headphone is not connected to the headphone jack, the terminal device 6 outputs a sound from the loudspeakers 23, and if a headphone is connected to the headphone jack, the terminal device 6 does not output a sound from the loudspeakers 23. That is, in the exemplary embodiment, sound is not outputted from the loudspeakers 23 and the headphone at the same time, and thus the output from the loudspeakers 23 and the output from the headphone have a mutually exclusive relationship (in another embodiment, both outputs may be allowed at the same time).

The terminal device 6 includes a touch panel 22. The touch panel 22 is an example of a position detection section for detecting a position of an input performed on a predetermined input surface (a screen of the display section) provided on the housing 20. Further, the terminal device 6 includes, as an operation section (an operation section 31 shown in FIG. 4), analog sticks 25, a cross key 26, buttons 27, and the like.

Figure 4:
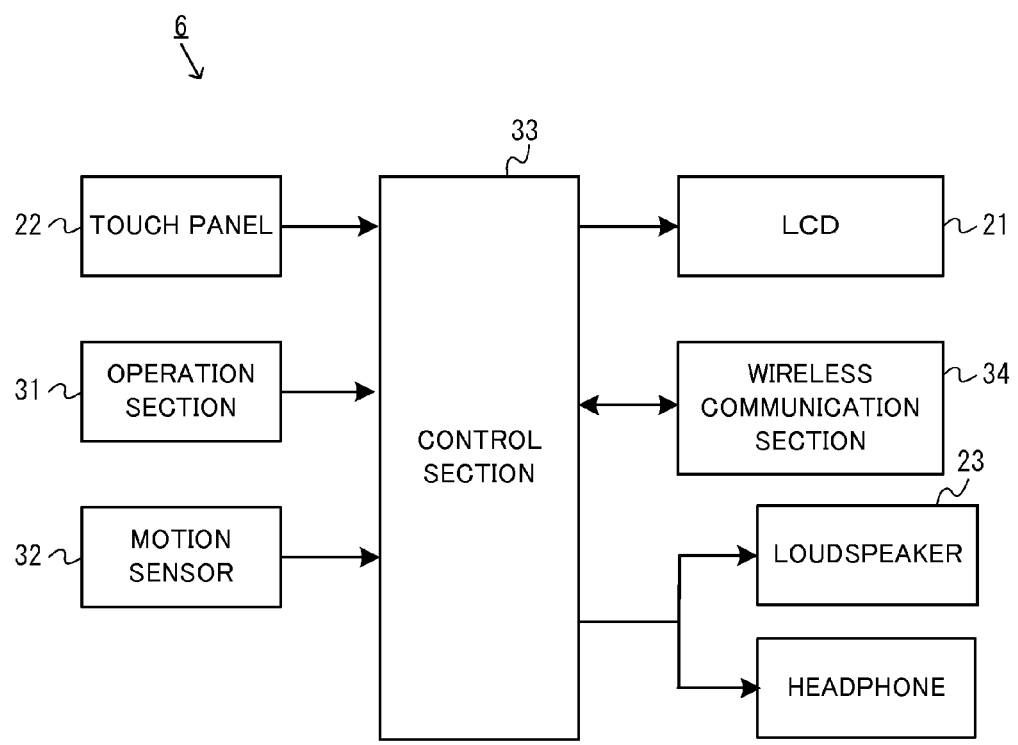
FIG. 4 is a block diagram showing a non-limiting example of the internal structure of the terminal device 6.

FIG. 4 is a block diagram illustrating an electrical configuration of the terminal device 6. As shown in FIG. 4, the terminal device 6 includes the above-mentioned LCD 21, touch panel 22, loudspeakers 23, volume control slider 28, and control section 31. In addition, a headphone can be connected to the terminal device 6 via the headphone jack 24. In addition, the terminal device 6 includes a motion sensor 32 for detecting the attitude of the terminal device 6. In the exemplary embodiment, an acceleration sensor and a gyro sensor are provided as the motion sensor 32. The acceleration sensor can detect accelerations on three axes of x, y, and z axes. The gyro sensor can detect angular velocities on three axes of x, y, and z axes.

The terminal device 6 includes a wireless communication section 34 capable of wirelessly communicating with the game apparatus body 5. In the exemplary embodiment, wireless communication is performed between the terminal device 6 and the game apparatus body 5. In another exemplary embodiment, wired communication may be performed.

The terminal device 6 includes a control section 33 for controlling operations in the terminal device 6. Specifically, the control section 33 receives output data from the respective input sections (the touch panel 22, the operation section 31, and the motion sensor 32), and transmits the output data as operation data to the game apparatus body 5 via the wireless communication section 34. When the terminal game image from the game apparatus body 5 is received by the wireless communication section 34, the control section 33 performs, according to need, appropriate processes (e.g., decompression if the image data is compressed), and causes the LCD 21 to display the image from the game apparatus body 5. Further, when the terminal game sound from the game apparatus body 5 is received by the wireless communication section 34, the control section 33 outputs the terminal game sound to the loudspeakers 23.

Next, with reference to FIGS. 5 to 11, the summary of processing executed in the system of the exemplary embodiment will be described.

The processing executed in the exemplary embodiment provides a new way of reproducing music emitted from a sound source object present in a virtual 3-dimensional space (hereinafter, simply referred to as a virtual space). It is noted that the sound source object is defined as an object that can emit a predetermined sound.

As an example of the processing of the exemplary embodiment, the following game processing will be assumed. That is, in a game realized by the present game processing, a player character can freely move in a virtual space simulating a theme park. In the virtual space, a plurality of "attractions" are set, and mini games different among the attractions can be played.

Figure 5:
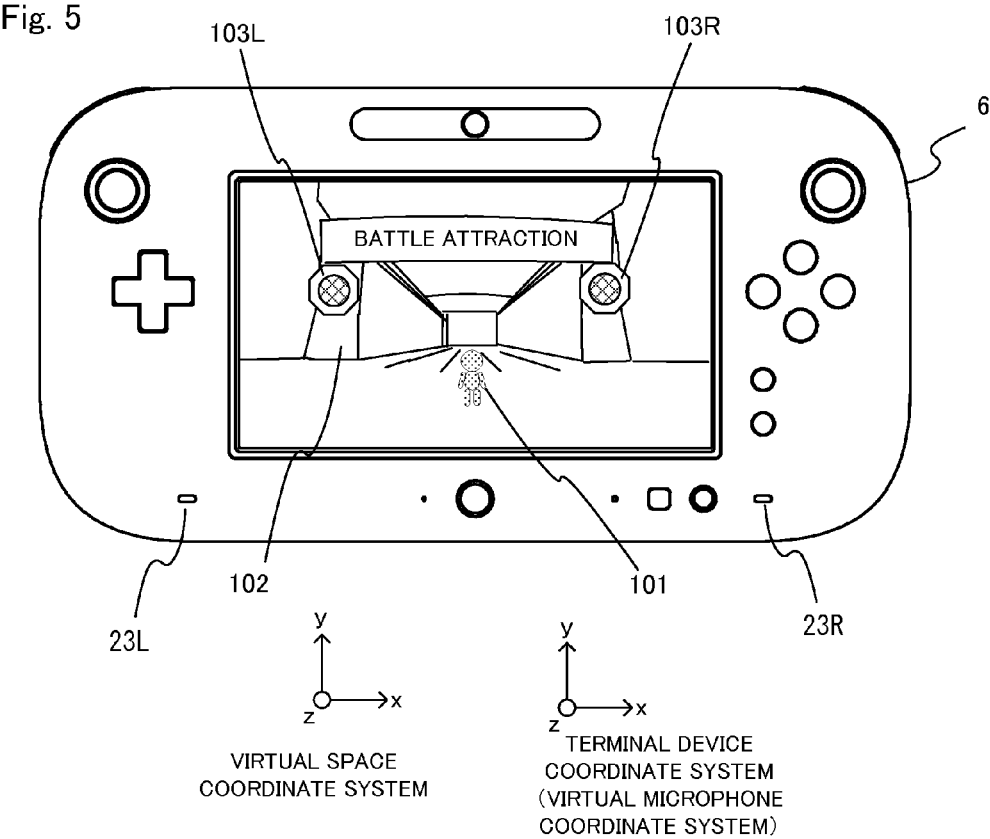
FIG. 5 is a diagram showing a non-limiting example of a game screen.

FIG. 5 is an example of a game screen displayed on the terminal device 6. In FIG. 5, a player character 101 and an entrance object 102 which is an entrance of a predetermined attraction are displayed. Regarding the player character 101, its figure as seen from the back side is displayed. In addition, on the entrance object 102, a left loudspeaker image 103L and a right loudspeaker image 103R are displayed (hereinafter, may be collectively referred to as loudspeaker images 103).

Here, in the present game, a game screen is displayed such that the coordinate system of the real space and the coordinate system of the virtual space always coincide with each other. In other words, the gravity direction is always perpendicular to a ground plane in the virtual space. In addition, the terminal device 6 has the motion sensor 32 as described above. By using this, the orientation of the terminal device 6 can be detected. Further, in the present game, in accordance with the orientation of the terminal device 6, a virtual camera is also inclined at the same time, whereby the terminal device 6 can be treated like a "peep window" for peeping into the virtual space. For example, as the orientation of the terminal device 6, it will be assumed that the terminal device 6 is grasped such that the LCD 21 thereof faces to the front of the player's face. At this time, it will be assumed that the virtual space in the positive direction of the z axis is displayed on the LCD 21. From this state, if the player turns 180 degrees to face right backward, the virtual space in the negative direction of the z axis will be displayed on the LCD 21.

Here, in such a game in which a virtual space is represented as described above, sound may be reproduced. The sound is roughly classified into two types of "sound effect" and "music (BGM)". In a conventional method for reproducing such sounds, regarding the sound effect, a virtual microphone is placed in a virtual space, and then acoustic field calculation (for volume and localization) is performed assuming that the sound effect is heard through the virtual microphone, thereby reproducing the sound effect. Meanwhile, it is general that music, particularly, BGM is always reproduced at a constant volume and a constant localization, irrespective of the position of a virtual camera or a virtual microphone. That is, BGM is reproduced irrespective of the state of a virtual space, as it were, "outside" the virtual world.

Figure 6:
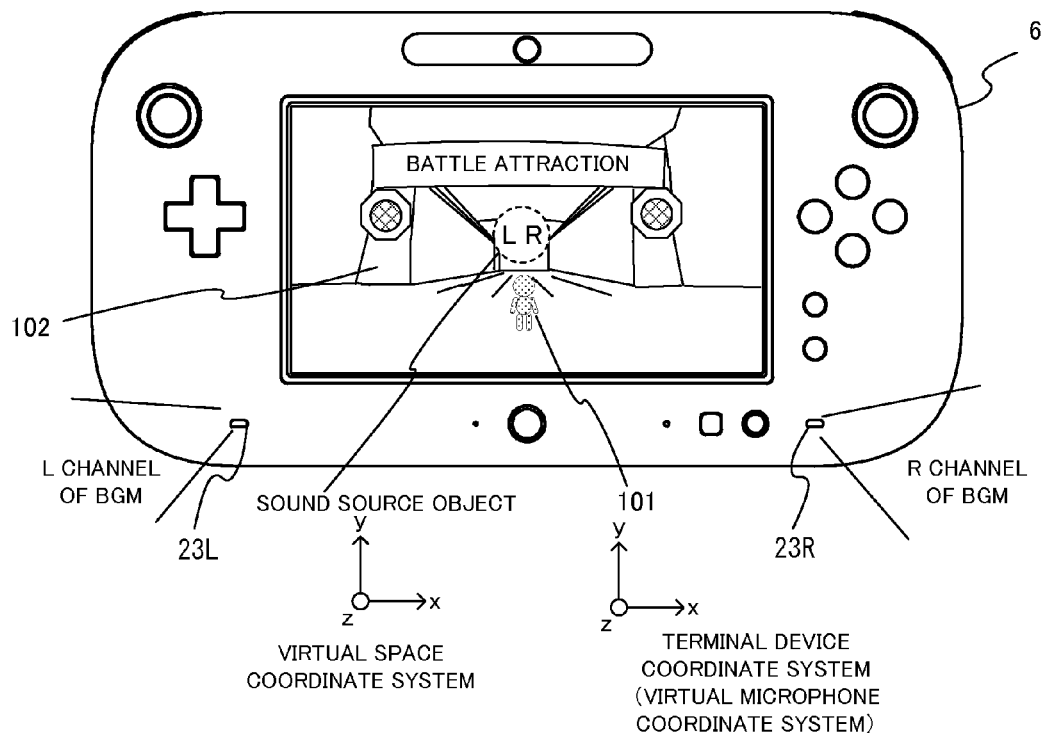
FIG. 6 is a diagram showing a non-limiting example of a game screen.

Here, it will be assumed that such an expression that BGM is reproduced "inside" a virtual space is to be performed. Particularly, it will be assumed that the BGM is composed of stereo sounds, that is, stereo 2ch sounds of L and R. In this case, a sound source object that emits sound based on BGM data composed of the 2ch sounds is placed in the virtual space, whereby the BGM is reproduced. Then, processing of assuming that the sound is heard through the virtual microphone can be performed. For example, in FIG. 5, the case of performing such expression that the BGM is emitted from the loudspeaker images 103 provided on the entrance object 102, will be assumed. In this case, as shown in FIG. 6, a sound source object (which is a transparent object invisible to a player) is placed substantially at the middle between the two loudspeaker images 103. Then, processing of emitting (reproducing) the BGM composed of 2ch sounds from the sound source object is performed. Further, processing of picking up the emitted sound by a virtual microphone is performed. Here, it will be assumed that the virtual microphone is placed at the same position as the player character 101, that is, the virtual microphone is placed substantially right in front of the sound source object. As a result, a sound of the BGM data according to L channel is outputted from the loudspeaker 23L, and a sound of the BGM data according to R channel is outputted from the loudspeaker 23R. In other words, in the state shown in FIG. 6, the left-right positional (localization) relationship between L channel and R channel of the sound source object is equal to the left-right positional relationship between the loudspeakers 23L and 23R of the terminal device 6.

Figure 7:
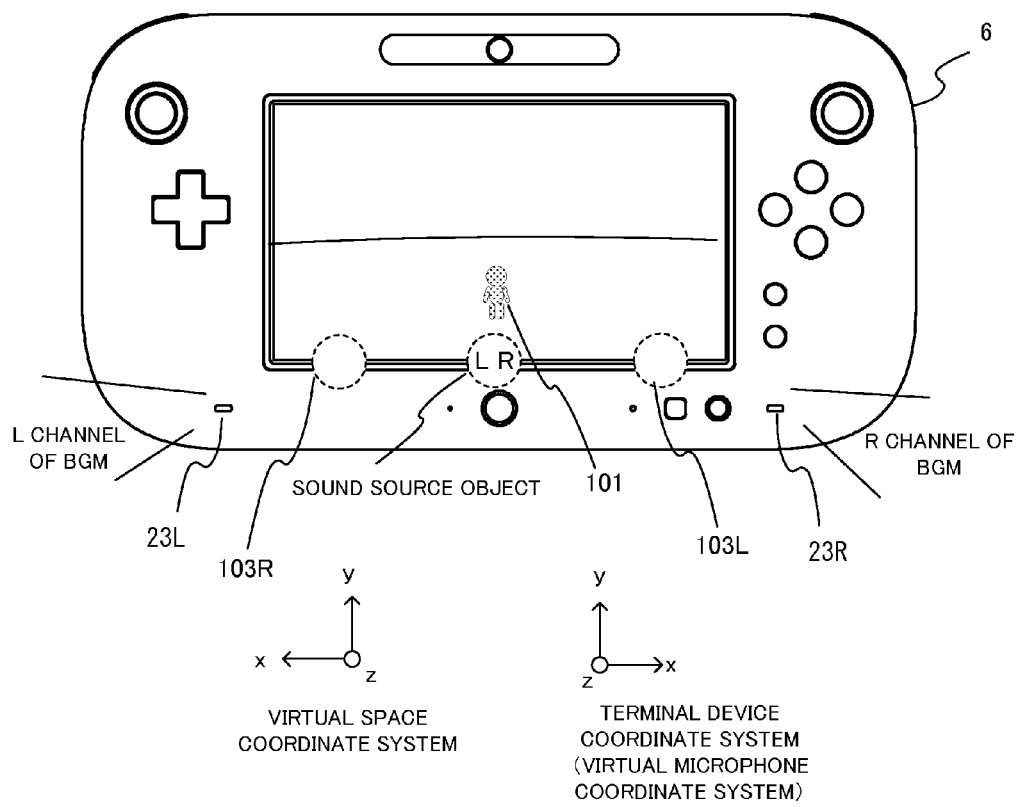
FIG. 7 is a diagram showing a non-limiting example of a game screen.

Next, it will be assumed that, from the state shown in FIG. 6, the player character 101 is turned 180 degrees. For example, it will be assumed that, in the state in which a player is grasping the terminal device 6 with both hands such that the LCD 21 of the terminal device 6 faces to the front of the face of the player, the player turns 180 degrees to face right backward. FIG. 7 is a diagram showing a screen displayed after the 180-degree turn from the state shown in FIG. 6. Along with the turn of the player (terminal device 6), the directions of the player character 101, the virtual camera, and the virtual microphone have also turned 180 degrees. In this case, the positional relationship in the virtual space is such that the sound source object is positioned substantially right in back of the player character 101 (virtual microphone). In addition, the left loudspeaker image 103L is positioned on the right and in back of the player character 101, and the right loudspeaker image 103R is positioned on the left and in back of the player character 101. On the other hand, the localization of the BGM emitted from the sound source object is still kept as it has been. That is, similarly to the case in FIG. 6, the sound of L channel of the BGM is outputted from the loudspeaker 23L, and the sound of R channel of the BGM is outputted from the loudspeaker 23R. In this case, the player hears the sounds of L and R channels in reversed condition from FIG. 6, and therefore the player feels strangeness in hearing. In view of the positional relationship when the player character 101 has turned 180 degrees, the player can hear rather naturally if the sound of L channel in the state in FIG. 6 is outputted from the loudspeaker 23R in the state in FIG. 7 and the sound of R channel is outputted from the loudspeaker 23L in the state in FIG. 7.

Accordingly, in the exemplary embodiment, processing of making the BGM heard naturally even if orientation change (change in positional relationship) has occurred as described above, is performed. Specifically, in the exemplary embodiment, first, L channel and R channel of BGM data to be reproduced are separated into respective pieces of sound data. Then, two sound source objects are placed at separate positions. The sound data of L channel (hereinafter, L channel data) is assigned to one of the sound source objects, and the sound data of R channel (hereinafter, R channel data) is assigned to the other one, whereby the L channel data and the R channel data are reproduced. That is, instead of providing a sound source object that reproduces one piece of BGM data containing L and R channels as described above, separate sound source objects are set and placed for L and R channels, respectively. Then, processing is performed to adjust sounds outputted from the loudspeakers 23L and 23R in accordance with the direction of a virtual microphone that picks up sounds emitted from the sound source objects and the positional relationship between the virtual microphone and each of the two sound source objects. Specifically, in a local coordinate system (hereinafter, a virtual microphone coordinate system) based on the virtual microphone, it is determined whether the position of each of the two sound source objects is in the positive region of the x axis or the negative region of the x axis. Thus, it can be determined whether the position of each of the two sound source objects is on the right or the left as seen from the virtual microphone. Based on this positional relationship, the reproduction volumes of the L channel data and the R channel data for the loudspeakers 23L and 23R are determined.

Figure 8:
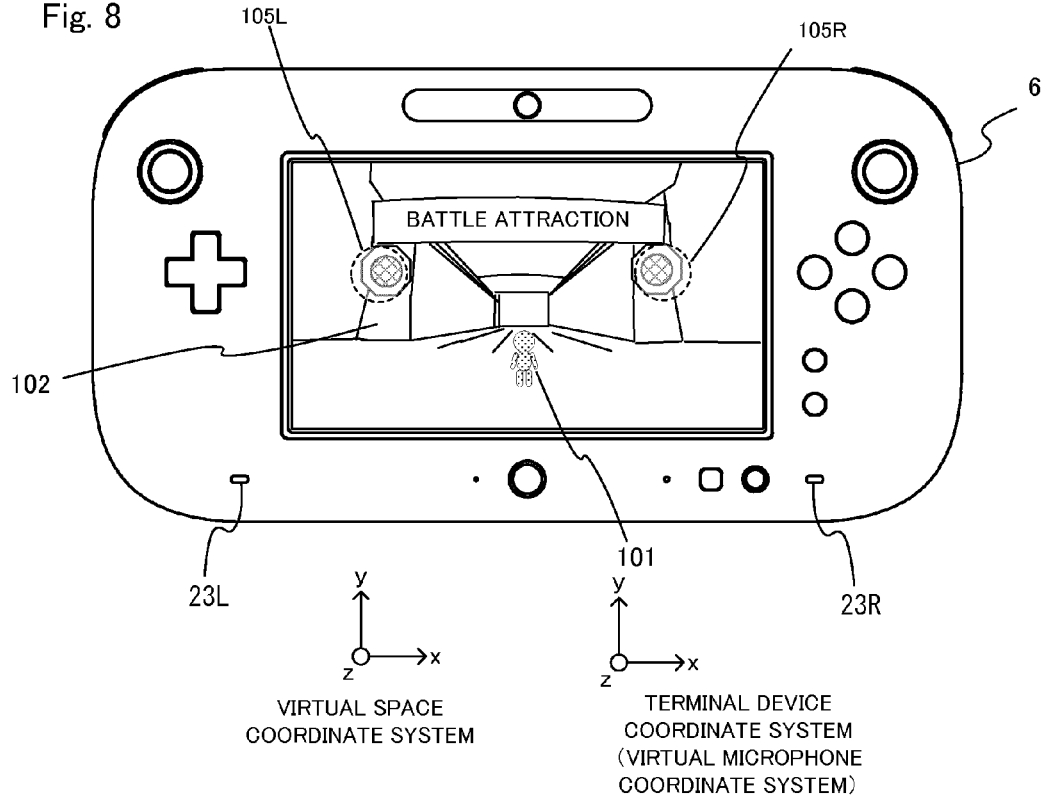
FIG. 8 is a diagram showing a non-limiting example of a game screen.

FIG. 8 is a diagram showing an example of a game screen and the placement of sound source objects in the exemplary embodiment. In FIG. 8, a sound source object 105L is placed at a position overlaying on the left loudspeaker image 103L, and the sound source object 105R is placed at a position overlaying on the right loudspeaker image 103R. These sound source objects are transparent objects invisible to a player. The L channel data of BGM to be reproduced is associated with the sound source object 105L, and the R channel data of BGM to be reproduced is associated with the sound source object 105R. That is, the sound source object 105L is set to reproduce the L channel data, and the sound source object 105R is set to reproduce the R channel data. In addition, similarly to the above case, a virtual microphone is placed at the position of the player character, and the virtual microphone faces in the forward direction (positive direction of z axis). When a BGM is reproduced in such a state, a sound emitted from the sound source object 105L is mainly heard from the loudspeaker 23L (heard more loudly than from the loudspeaker 23R), and a sound emitted from the sound source object 105R is mainly heard from the loudspeaker 23R (heard more loudly than from the loudspeaker 23L).

Figure 9:
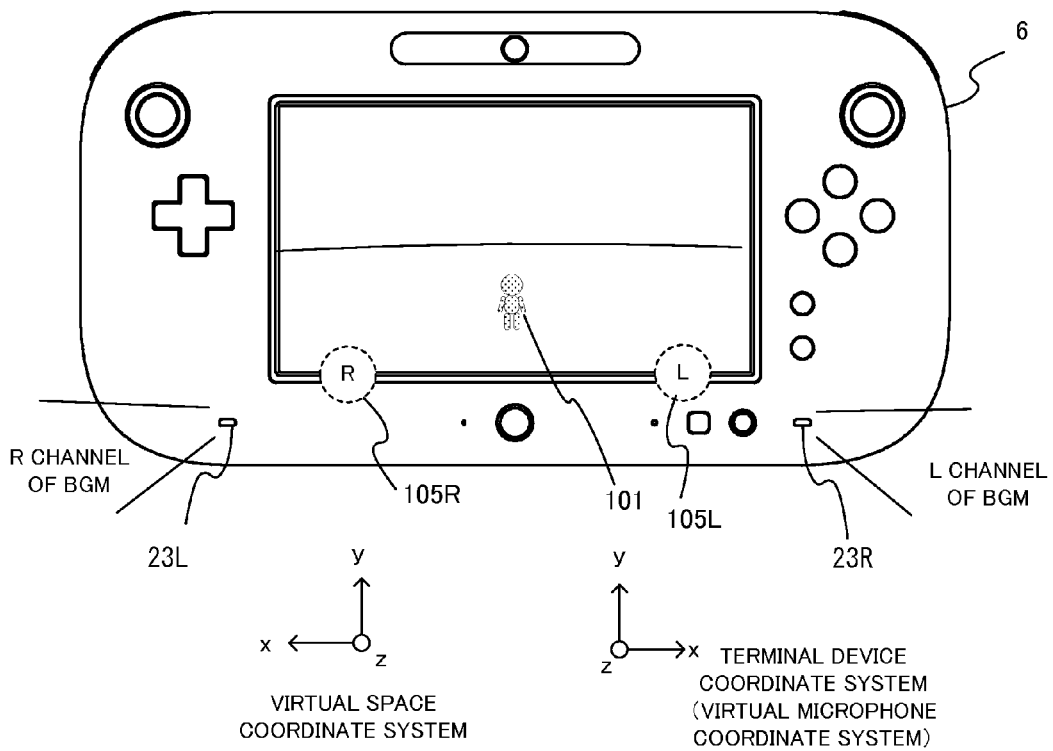
FIG. 9 is a diagram showing a non-limiting example of a game screen.

On the other hand, it will be assumed that a player (terminal device 6) turns 180 degrees from the state in FIG. 8 as described above. FIG. 9 is a diagram showing a game screen displayed at this time. In this state, the sound source object 105L is positioned on the right and in back of the player character 101 (virtual microphone), and the sound source object 105R is positioned on the left and in back of the player character 101. In addition, along with the orientation change of the terminal device 6, the forward direction of the virtual microphone is also directed in the negative direction of the z axis in the virtual space. That is, with reference to the virtual microphone, the sound source object 105L is positioned on the right and the sound source object 105R is positioned on the left. Then, when the BGM is reproduced in such a state, a sound emitted from the sound source object 105L is mainly heard from the loudspeaker 23R, and a sound emitted from the sound source object 105R is mainly heard from the loudspeaker 23L. That is, the BGM is reproduced so as to reflect therein the position and the direction of the player character (virtual microphone) and the positional relationship between the two sound source objects. Thus, BGM reproduction from sound sources present in a virtual space can be more accurately expressed, thereby realizing BGM reproduction that does not cause a player to feel strangeness.

Figure 10:
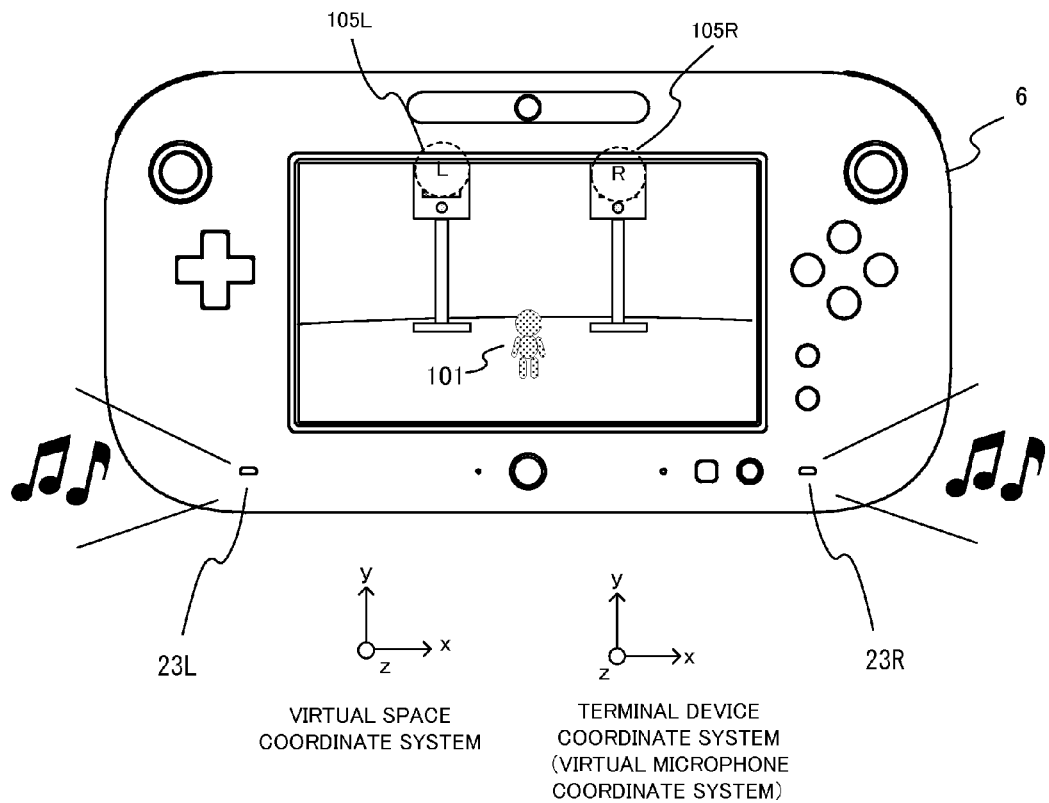
FIG. 10 is a diagram showing a non-limiting example of a game screen.

It is noted that in the exemplary embodiment, since reproduction processing is performed so as to reflect therein the position of a sound source object in a virtual space as described above, the following sound reproduction can be also performed, for example. For example, as shown in FIG. 10, it will be assumed that the sound source objects 105L and 105R are positioned in the forward and upward direction of the player character 101 and a BGM is reproduced therefrom. In FIG. 10, only the lower halves of the sound source objects 105L and 105R are displayed within a screen. In this state, in the microphone coordinate system, the sound source objects are positioned above the virtual microphone (in the positive direction of the y axis in the space coordinate system of the virtual space). In this case, the volumes of sounds outputted from the loudspeakers 23L and 23R are substantially equal to each other.

Figure 11:
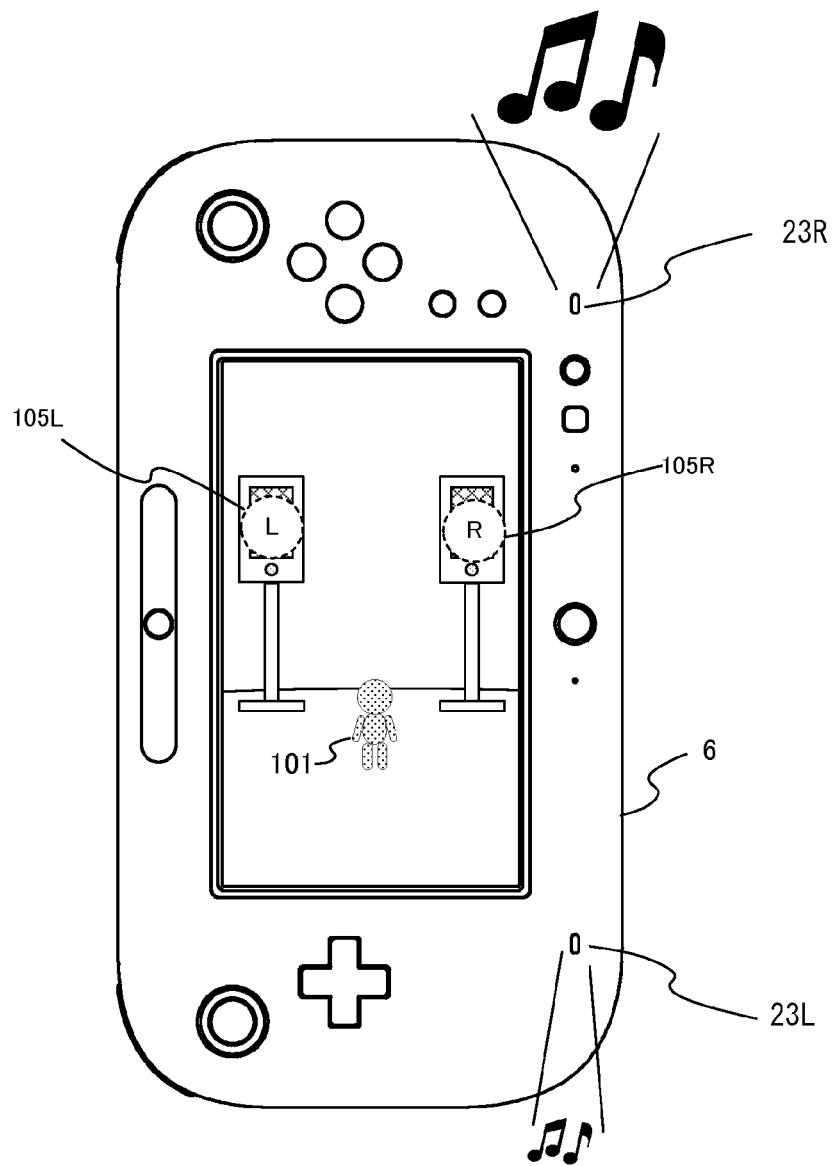
FIG. 11 is a diagram showing a non-limiting example of a game screen.
Figure 11:
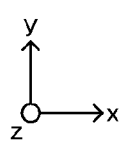
Figure 11:
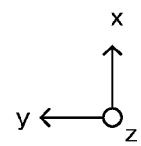

Next, it will be assumed that, from the state in FIG. 10, the terminal device 6 is turned 90 degrees leftward as shown in FIG. 11 (for example, a player holds the terminal device 6 vertically). In this case, the positional relationship between the loudspeakers 23L and 23R changes from left-and-right arrangement to below-and-above arrangement. In addition, along with the orientation change of the terminal device 6, the orientation of the virtual microphone is also turned 90 degrees leftward (that is, the orientation of the terminal device 6 and the orientation of the virtual microphone are coordinated with each other). As a result, in the microphone coordinate system, the sound source objects 105L and 105R are positioned on the right of the virtual microphone. In such a case, in the exemplary embodiment, sounds are outputted such that the volume of the loudspeaker 23R, i.e., a loudspeaker positioned on the upper side in the real space is relatively increased, and the volume of the loudspeaker 23L, i.e., a loudspeaker positioned on the lower side in the real space is relatively decreased. In other words, the right-left volume balance between the loudspeakers 23L and 23R is adjusted. Thus, the positional relationship of a sound source object with respect to the vertical direction (y axis direction) in the virtual space can be also reflected in their sound outputs. In addition, although the vertical direction case has been shown in the above example, for example, the positional relationship with respect to the depth direction (z axis direction in the virtual space) can be also reflected in the output volumes of the loudspeakers 23L and 23R in the same manner. For example, when the orientation of the terminal device 6 is changed so that the LCD 21 faces upward, the sound output can be performed so as to reflect therein the positional relationship with respect to the depth direction.

Next, with reference to FIGS. 12 to 18, the operation of the system 1 for realizing the above game processing will be described in detail.

Figure 12:
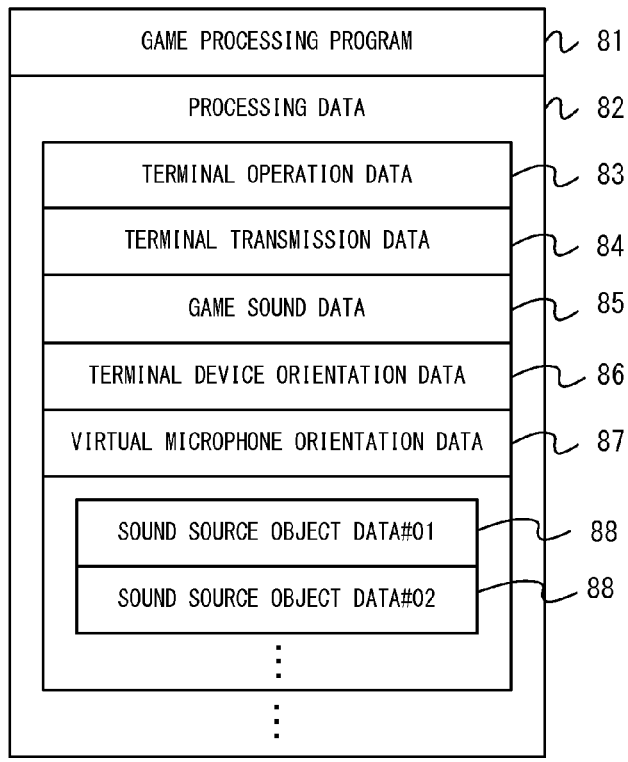
FIG. 12 is a non-limiting exemplary diagram showing the memory map of a memory 12.

FIG. 12 shows an example of various types of data to be stored in the memory 12 of the game apparatus body 5 when the above game is executed.

A game processing program 81 is a program for causing the CPU 11 of the game apparatus body 5 to execute the game processing for realizing the above game. The game processing program 81 is, for example, loaded from an optical disc onto the memory 12.

Processing data 82 is data used in game processing executed by the CPU 11. The processing data 82 includes terminal operation data 83, terminal transmission data 84, game sound data 85, terminal device orientation data 86, virtual microphone orientation data 87, sound source object data 88, and the like.

Figure 13:
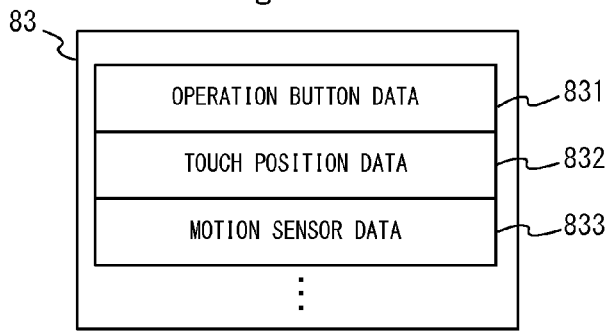
FIG. 13 is a diagram showing a non-limiting example of the configuration of terminal operation data 83.

The terminal operation data 83 is operation data periodically transmitted from the terminal device 6. FIG. 13 is a diagram showing an example of the configuration of the terminal operation data 83. The terminal operation data 83 includes operation button data 91, touch position data 92, motion sensor data 93, and the like. The operation button data 91 is data indicating the input state of the operation section 31 (analog stick 25, cross key 26, and button 27). In addition, the input content of the motion sensor 32 is also included in the operation button data 91. The touch position data 92 is data indicating the position (touched position) where an input is performed on the input surface of the touch panel 22. The motion sensor data 93 is data indicating the acceleration and the angular velocity which are respectively detected by the acceleration sensor and the angular velocity sensor included in the above motion sensor.

Returning to FIG. 12, the terminal transmission data 84 is data periodically transmitted to the terminal device 6. The terminal transmission data 84 includes the terminal game image and the terminal game sound described above.

The game sound data 85 includes sources of the terminal game sound and the monitor game sound described above. Specifically, the game sound data 85 includes a plurality of pieces of sound data of sound effects, and a plurality of pieces of BGM data each composed of two channels (L and R) of sounds as described above.

The terminal device orientation data 86 is data indicating the orientation of the terminal device 6. The virtual microphone orientation data 87 is data indicating the orientation of the virtual microphone. These pieces of orientation data are represented as a combination of three-axis vector data. It is noted that the virtual microphone orientation data 87 includes orientation data of the terminal virtual microphone and orientation data of the monitor virtual microphone. It is noted that in the following description, in the case of simply mentioning "virtual microphone orientation data 87", it refers to orientation data of the terminal virtual microphone.

Figure 14:
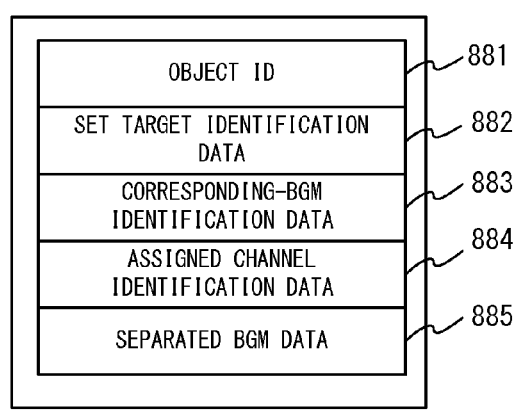
FIG. 14 is a diagram showing a non-limiting example of the configuration of sound source object data 88.

The sound source object data 88 is data relevant to the above sound source objects. A plurality of pieces of the sound source object data 88 are stored in the memory 12. FIG. 14 is a diagram showing an example of the configuration of each piece of the sound source object data 88. Each piece of the sound source object data 88 includes an object ID 881, set target identification data 882, corresponding-BGM identification data 883, assigned channel identification data 884, and separated BGM data 885.

The object ID 881 is an ID for identifying each sound source object. The set target identification data 882 is data indicating another sound source object to be paired with the sound source object. In the exemplary embodiment, one piece of BGM data is separated into L channel and R channel to be assigned to two sound source objects, respectively. Therefore, the two sound source objects are treated as a pair of sound source objects (hereinafter, referred to as set-type sound source objects). Thus, the set target identification data is data indicating another sound source object to be paired with each sound source object. For example, the set target identification data indicates the object ID 881 of the other sound source object of the pair. With respect to a sound source object not to be paired (for example, a sound source object that emits only a sound effect; hereinafter, referred to as a single-type sound source object), information indicating that the sound source object is not to be paired is set as the set target identification data 882.

The corresponding-BGM identification data 883 is data indicating a piece of BGM data defined as a BGM to be reproduced by the sound source object. For example, such data is information indicating a piece of BGM data (composed of 2ch sounds) included in the game sound data 85.

The assigned channel identification data 884 is data indicating whether the sound source object is assigned to L channel or R channel in the case where the sound source object is the set-type sound source object.

The separated BGM data 885 is one of L channel sound data and R channel sound data which have been separated from BGM data composed of LR 2ch sounds.

Besides, although not shown, information about a sound emitted by each sound source object is included as necessary, such as information indicating whether or not the sound source object is currently emitting a sound, and information defining the volume, and the directionality, and the like of a sound emitted by the sound source object.

Figure 16:
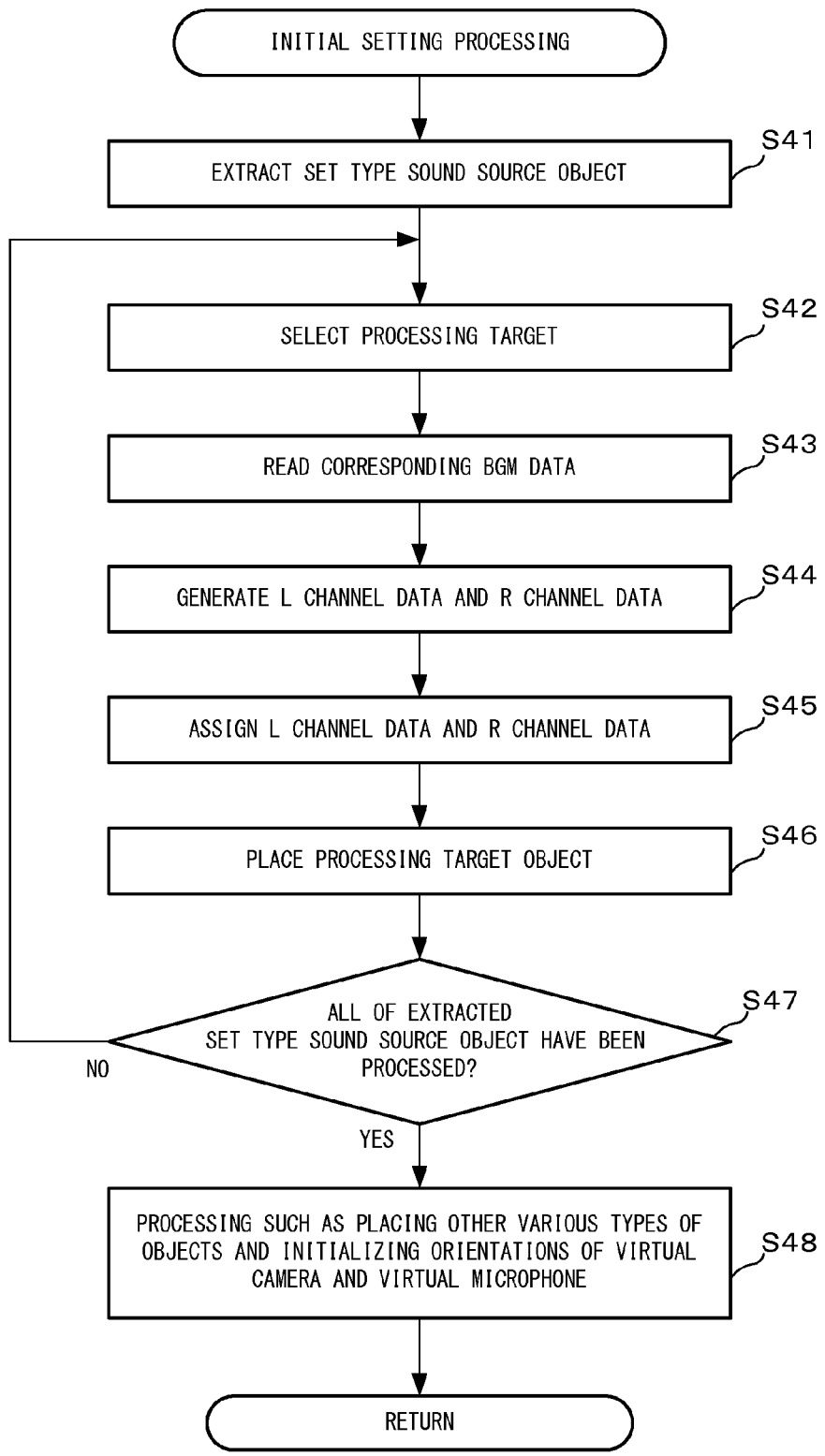
FIG. 16 is a non-limiting exemplary flowchart showing the details of initial setting processing shown in FIG. 15.
Figure 17:
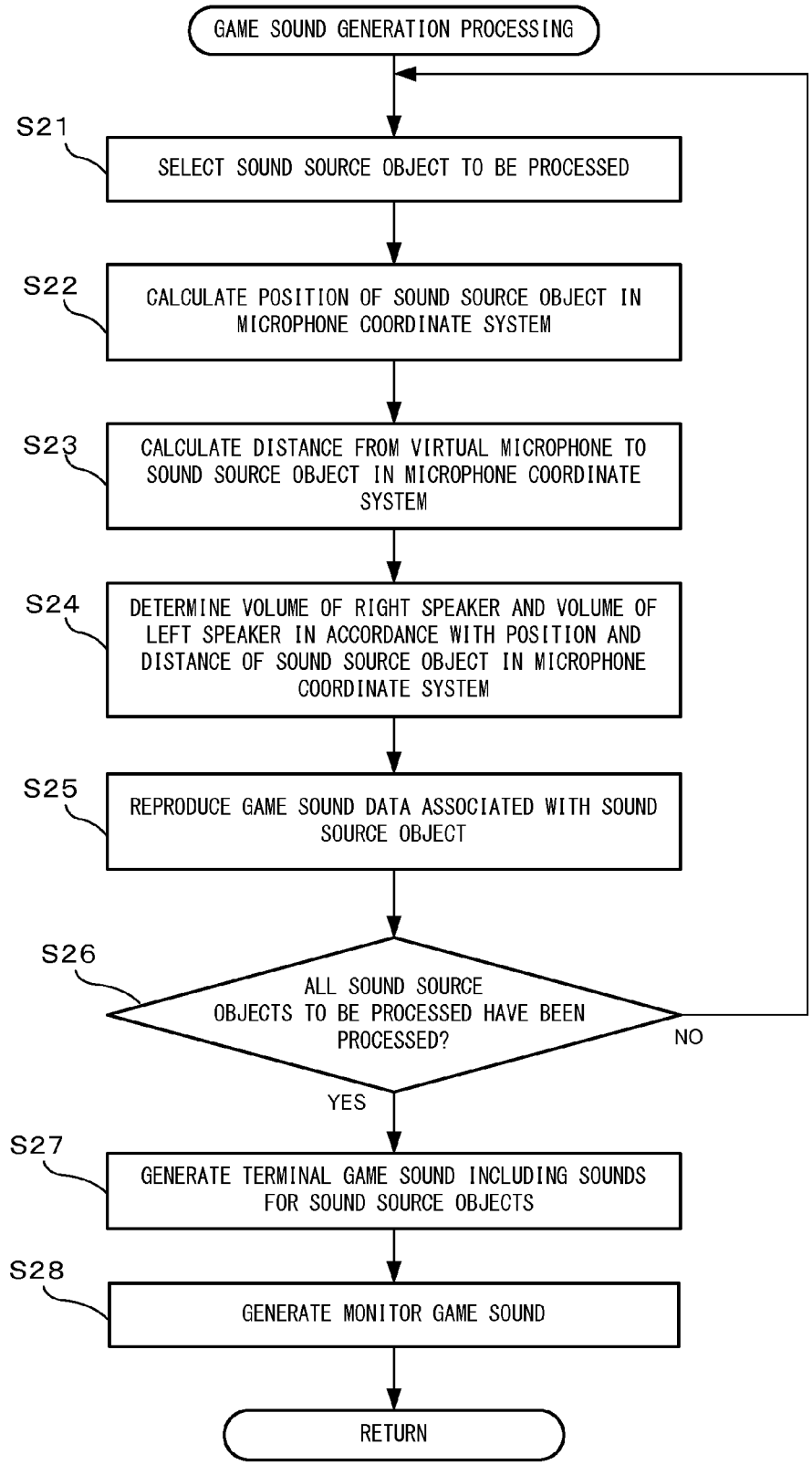
FIG. 17 is a non-limiting exemplary flowchart showing the details of game sound generation processing shown in FIG. 15.

Next, with reference to flowcharts shown in FIGS. 15 to 17, the flow of game processing executed by the CPU 11 of the game apparatus body 5 based on the game processing program 81 will be described.

Figure 15:
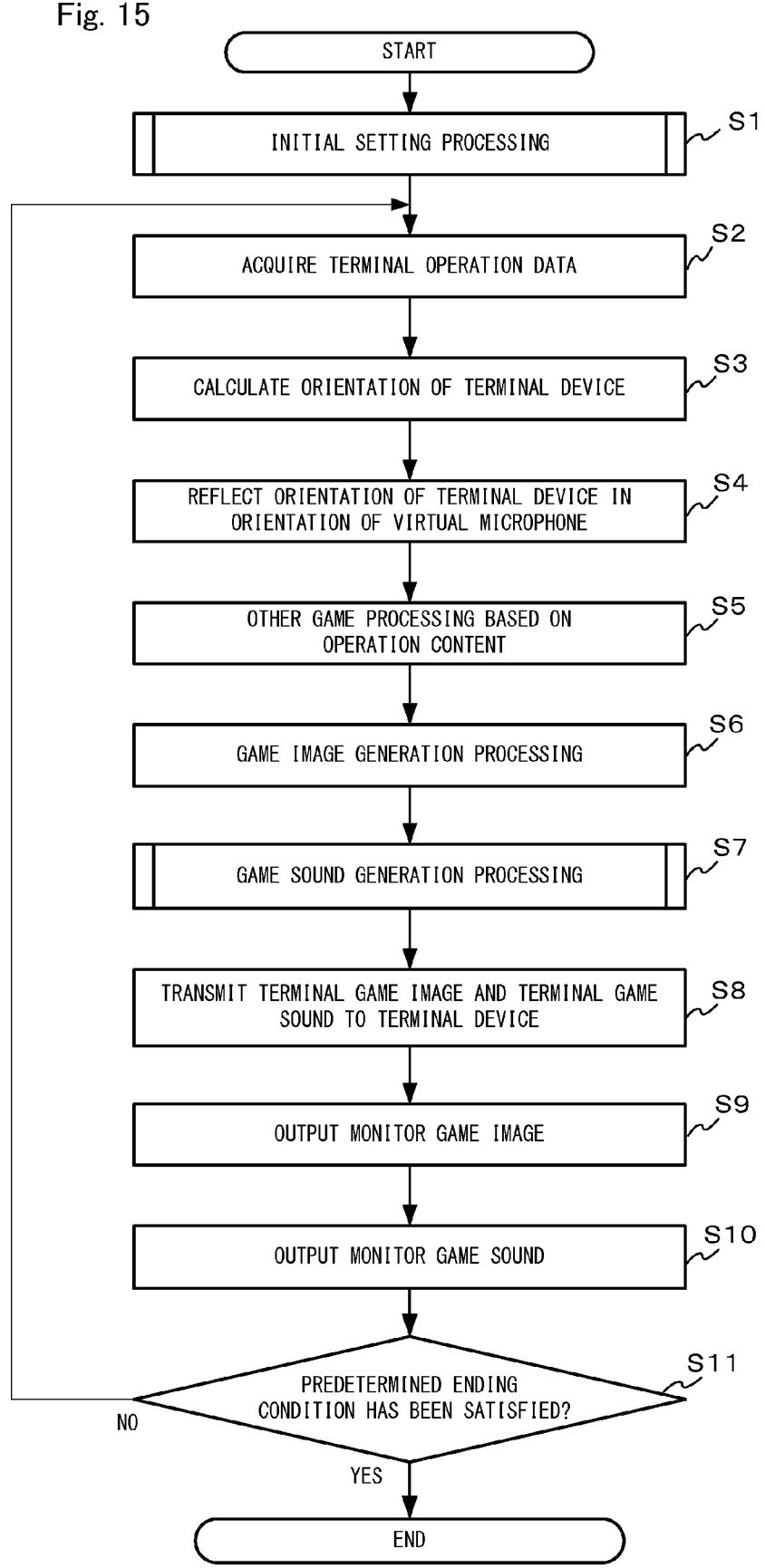
FIG. 15 is a non-limiting exemplary flowchart showing the flow of game processing based on a game processing program 81.

In FIG. 15, when execution of the game processing program 81 is started, in step S1, the CPU 11 performs initial setting processing. In the initial setting processing, initial setting is performed for various types of objects such as the above-described sound source object, these objects are placed in a virtual space, and the orientations of a virtual camera and a virtual microphone (virtual microphone orientation data 87) are initialized. FIG. 16 is a flowchart showing the details of the initial setting processing. In the initial setting processing, first, setting for a set-type sound source object is performed. That is, in step S41, the CPU 11 extracts set-type sound source objects from the sound source objects.

Next, in step S42, the CPU 11 selects one pair of set-type sound source objects to be processed, from the extracted set-type sound source objects. Hereinafter, the selected pair is referred to as processing target objects.

Next, in step S43, the CPU 11 acquires BGM data to be reproduced by the processing target objects from the game sound data 85, based on the corresponding-BGM identification data 883. In the subsequent step S44, the CPU 11 generates L channel data and R channel data based on the acquired BGM data.

Next, in step S45, the CPU 11 assigns the generated L channel data and R channel data to the respective processing target objects (two sound source objects). That is, first, the CPU 11 refers to the assigned channel identification data 884 of one sound source object of the processing target objects. Then, the CPU 11 stores, as the separated BGM data 885, one of the L channel data and the R channel data that corresponds to the channel indicated by the assigned channel identification data 884. Similarly, the CPU 11 stores the other one of the L channel data and the R channel, as the separated BGM data 885 of the other sound source object of the processing target objects. Thus, for one BGM, two sound source objects are set, i.e., a sound source object that reproduces only a sound of L channel and a sound source object that reproduces only a sound of R channel.

Next, in step S46, the CPU 11 places the processing target objects at predetermined positions in the virtual space. Regarding the placement positions, it is preferable that, as in the sound source objects 105L and 105R shown in FIG. 8, the two sound source objects are placed with a certain distance therebetween in the left-right direction (that is, so as to have a positional relationship that provides a stereo effect).

Next, in step S47, the CPU 11 determines whether or not the above processing has been performed for all the set-type sound source objects extracted in the above step S41. As a result, if there is still a set-type sound source object that has not been processed yet (NO in step S47), the process returns to the above step S42 to repeat the processing. On the other hand, if all the set-type sound source objects have been processed (YES in step S47), in the subsequent step S48, the CPU 11 executes other initial setting processing. That is, the CPU 11 executes such processing of placing various types of objects (such as a single-type sound source object and a player character) in the virtual space, initializing the orientations of a virtual camera, a virtual microphone, and the like, and initializing various types of variables. It is noted that the initial values of the virtual camera and the virtual microphone correspond to the state in which the directions of the axes in the microphone coordinate system respectively coincide with the directions of the axes in the space coordinate system of the virtual 3-dimensional space. Thus, the initial setting processing is finished.

Returning to FIG. 15, next, in step S2, the CPU 11 acquires the terminal operation data 83.

Next, in step S3, the CPU 11 calculates the current orientation of the terminal device 6 based on the motion sensor data 93 (acceleration data and angular velocity data). Data indicating the calculated orientation is stored as the terminal device orientation data 86 into the memory 12.

Next, in step S4, the CPU 11 reflects the current orientation of the terminal device 6 in the orientation of the virtual microphone (terminal virtual microphone). Specifically, the CPU 11 reflects the orientation indicated by the terminal device orientation data 86 in the virtual microphone orientation data 87.

Next, in step S5, the CPU 11 executes predetermined game processing based on an operation content indicated by the terminal operation data 83 (an operation content mainly indicated by the operation button data 91 or the touch position data 92). For example, processing of moving a variety of characters such as a player character is performed.

Next, in step S6, the CPU 11 executes processing of generating a game image in which a result of the above game processing is reflected. For example, a game image is generated by taking, with a virtual camera, an image of the virtual game space in which the player character has moved based on the operation content. In addition, at this time, the CPU 11 generates two images of a monitor game image and a terminal game image as necessary in accordance with the game content. For example, these images are generated by using two virtual cameras.

Next, in step S7, the CPU 11 executes game sound generation processing for generating a monitor game sound and a terminal game sound. FIG. 17 is a flowchart showing the details of the game sound generation processing shown in the above step S7. In FIG. 17, first, in step S21, the CPU 11 selects one sound source object as a processing target. Thus, in the case where a plurality of sound source objects in the virtual space, these sound source objects are to be sequentially processed one by one. It is noted that the sound source object to be processed is, for example, a sound source object that is currently emitting a sound.

Next, in step S22, the CPU 11 calculates the position and the direction of the sound source object to be processed, in the microphone coordinate system. Thus, it can be recognized whether the sound source object is positioned on the right side or the left side of the virtual microphone (with respect to the forward direction of the virtual microphone as a reference) in the microphone coordinate system.

Next, in step S23, the CPU 11 calculates the straight-line distance from the virtual microphone to the sound source object in the microphone coordinate system. In the subsequent step S24, the CPU 11 determines the volume values of the loudspeakers 23L and 23R based on: the calculated position, direction, and distance of the sound source object in the microphone coordinate system; and the direction of the virtual microphone. That is, the left-right volume balance between the loudspeakers 23L and 23R is determined.

Next, in step S25, the CPU 11 reproduces a piece of the game sound data 85 associated with the sound source object. Here, in the case where the sound source object is a set-type sound source object, the sound to be reproduced is based on the separated BGM data 885. As a result, only a sound of L channel or a sound of R channel of a predetermined BGM is reproduced from the set-type sound source object. It is noted that the reproduction volume complies with the volume determined by the above step S24.

Next, in step S26, the CPU 11 determines whether or not all of the sound source objects to be processed have been processed as described above. If there is still a sound source object that has not been processed yet (NO in step S26), the CPU 11 returns to the above step S21 to repeat the above processing. On the other hand, if all of the sound source objects have been processed (YES in step S26), in step S27, the CPU 11 generates a terminal game sound including sounds according to the respective processed sound source objects.

In the subsequent step S28, the CPU 11 generates, as necessary, a monitor game sound in accordance with a result of the game processing, by using the monitor virtual microphone. Here, basically, the monitor game sound is generated for the loudspeakers 2L and 2R by the same processing as in the terminal game sound. Thus, the game sound generation processing is finished.

Returning to FIG. 15, in step S8 subsequent to the game sound generation processing, the CPU 11 stores the terminal game image generated in the above step S3 and the terminal game sound generated by the above step S7 into the terminal transmission data 84, and transmits the terminal transmission data 84 to the terminal device 6. Here, for convenience of the description, it is assumed that the transmission cycle of the terminal game sound coincides with the transmission cycle of the terminal game image, as an example. However, in another exemplary embodiment, the transmission cycle of the terminal game sound may be shorter than the transmission cycle of the terminal game image. For example, the terminal game image may be transmitted in a cycle of 1/60 second, and the terminal game sound may be transmitted in a cycle of 1/180 second.

Next, in step S9, the CPU 11 outputs the monitor game image generated in the above step S6 to the monitor 2. In the subsequent step S10, the CPU 11 outputs the monitor game sound generated in the above step S7 to the loudspeakers 2L and 2R.

Next, in step S11, the CPU 11 determines whether or not a predetermined condition for ending the game processing has been satisfied. As a result, if the predetermined condition has not been satisfied (NO in step S11), the process returns to the above step S2 to repeat the above-described processing. If the predetermined condition has been satisfied (YES in step S11), the CPU 11 ends the game processing.

Next, with reference to the flowchart in FIG. 18, a flow of control processing executed by the control section 33 of the terminal device 6 will be described. First, in step S41, the control section 33 receives the terminal transmission data 84 transmitted from the game apparatus body 5.

Next, in step S42, the control section 33 outputs, to the LCD 21, the terminal game image included in the received terminal transmission data 84.

Next, in step S43, the control section 33 outputs the terminal game sound included in the received terminal transmission data 84, to the loudspeakers 23L and 23R. The volume balance complies with the volume determined in the above step S24.

Next, in step S44, the control section 33 detects an input (operation content) to the operation section 31, the motion sensor 32, or the touch panel 22, and thereby generates the operation button data 91, the touch position data 92, and the motion sensor data 93.

Next, in step S45, the control section 33 generates the terminal operation data 83 including the operation button data 91, and the touch position data 92 generated in the above step S44, and transmits the terminal operation data 83 to the game apparatus body 5.

Next, in step S46, the control section 33 determines whether or not a predetermined condition for ending the control processing for the terminal device 6 has been satisfied (for example, whether or not a power-off operation has been performed). As a result, if the predetermined condition has not been satisfied (NO in step S46), the process returns to the above step S41 to repeat the above-described processing. If the predetermined condition has been satisfied (YES in step S46), the control section 33 ends the control processing for the terminal device 6.

As described above, in the exemplary embodiment, BGM reproduction processing is performed reflecting therein the positional relationship between the sound source object (particularly, the set-type sound source object) and the virtual microphone in the virtual space, and the directions of them. Thus, when a BGM composed of 2ch sounds is reproduced from a sound source in a virtual world, a more accurate acoustic expression of the BGM can be realized, whereby a realistic sensation of the virtual space can be enhanced. Particularly, the above processing is suitable for game processing or the like based on a system in which a virtual space is displayed while the orientation of the terminal device 6 is changed like a "peep window" as described above.

In the above exemplary embodiment, in the initial setting processing, a predetermined BGM is separated into L channel data and R channel data, and they are assigned to different sound source objects. Instead of such processing, the following processing may be performed. For example, at a development stage of game software, pieces of sound data (L channel data and R channel data) of separated channels may be prepared in advance based on a 2ch BGM as described above, and may be stored in advance in the game sound data 85. Then, sound source object data may be prepared in advance so as to indicate the L channel data or the R channel data as BGM data for a predetermined sound source object. In this case, instead of the configuration of the sound source object data 88 shown in FIG. 14, only the object ID 881 and the corresponding-BGM identification data 883 may be included. Then, in the initial setting processing, similarly to data of other sound source objects, data of a sound source object that reproduces the L channel data or the R channel data may be read and placed in a virtual space as appropriate. This is advantageous because time for the initial setting processing is reduced.

Besides, in the game sound generation processing in the above step S7, the above channel separation processing for BGM, and the like may be performed in real time. For example, in the configuration of the sound source object data 88 shown in FIG. 14, only the separated BGM data 885 may be removed. Then, in the game sound generation processing, regarding the set-type sound source objects, the assigned channel identification data 884 of each sound source object of the pair may be referred to. Then, after a channel assigned to the sound source object is identified, the BGM data may be separated into L channel sound data and R channel sound data, and then only the sound data of the channel assigned to the sound source object may be reproduced.

In the above exemplary embodiment, a game system having two screens and two sets of stereo speakers (four loudspeakers), i.e., the monitor 2 and the terminal device 6 has been shown as an example. However, instead of such a configuration, for example, the above processing can be also applied to an information processing apparatus having a screen and stereo speakers, which are integrated with a housing thereof, such as a hand-held game apparatus. In addition, it is preferable that such an information processing apparatus has a motion sensor therein and thus capable of detecting the orientation of the information processing apparatus. Then, processing using a display system for a virtual space as described above can be preferably performed on such an information processing apparatus. In this case, the same processing as described above may be performed using just one virtual camera and one virtual microphone.

In addition, for example, while the terminal device 6 is used for display and various operations of the game screen to be directly operated by a player, the loudspeakers 23 of the terminal device 6 may not be used for the sound output but only the loudspeakers of the monitor 2 may be used. Also in this case, the above processing can be applied. For example, in the state in which a player is grasping the terminal device 6, when the player turns 180 degrees (that is, the player's back faces to the monitor 2) from the posture in which the player faces to the monitor 2, sounds of set-type sound source objects may be outputted to the loudspeakers 2L and 2R of the monitor 2 by using the above processing.

In addition, also in the case of using, for example, loudspeakers of 5.1 ch surround system as external loudspeakers, the same processing can be applied. In this case, for example, BGM data of 5.1 ch may be separated into respective channels of data (six pieces of sound data), and they may be assigned to six sound source objects. Then, as described above, the direction of a virtual microphone may be changed in accordance with the orientation change of the terminal device 6, and the BGM reproduction processing may be performed based on the positional relationship between each sound source object and the virtual microphone in the virtual space and the directions of them. Thus, owing to the increased number of loudspeakers, an acoustic effect with an enhanced realistic sensation can be provided on the BGM reproduction.

In addition, the above processing can be also applied to the case where a stereo headphone is connected to the terminal device 6 and a player listens to a game sound by using the stereo headphone, for example. In this case, a configuration that allows the game apparatus body 5 to detect the headphone connection state of the headphone jack 24, is used. For example, data indicating the connection state may be contained in the terminal operation data 83. Then, the above processing may be applied such that the outputs to the loudspeakers 23L and 23R in the above processing are replaced with outputs to left and right loudspeakers of the headphone. It is noted that the processing of sound adjustment with respect to the vertical direction in the case where the terminal device 6 is held vertically as shown in FIG. 11 may not be applied when a headphone is connected. This is because when a player wears a headphone, the positional relationship between loudspeakers is fixed to left-right arrangement.

In addition, the above processing may be applied to the case where a player can operate only the direction of a virtual camera without changing the orientation of the terminal device 6 (for example, a player changes the direction of a virtual camera by using the analog stick 25). The player feels as if the virtual space rotates around the player by the operation of the direction of the virtual camera. In this case, the direction of a virtual microphone may be changed along with the orientation of the virtual camera changed by the player's operation, instead of using the orientation of the terminal device 6. That is, the above processing may be performed while the orientation of the virtual microphone is changed so that the forward direction of the virtual microphone (the positive direction of the z axis) coincides with the forward direction of the virtual camera (the positive direction of the z axis).

The above processing may be applied by using all of two sets of stereo loudspeakers (a total of four loudspeakers), i.e., the loudspeakers 2L and 2R of the monitor 2 and the loudspeakers 23L and 23R of the terminal device 6. Particularly, such application is suitable for the case of using the terminal device 6 mainly in "vertical orientation". In this case, for example, movement of a sound source object in the right-left direction in a virtual space is reflected in outputs from the loudspeakers 2L and 2R of the monitor 2. In addition, movement of a sound source object in the up-down direction is reflected in outputs from the loudspeakers 23L and 23R of the terminal device 6. Thus, an acoustic effect with an enhanced realistic sensation can be obtained without using a speaker set of 5.1 ch, for example.

In addition, the game processing program for executing processing according to the above exemplary embodiment can be stored in any computer-readable storage medium (for example, a flexible disc, a hard disk, an optical disc, a magnet-optical disc, a CD-ROM, a CD-R, a magnetic tape, a semiconductor memory card, a ROM, a RAM or the like).

In the above exemplary embodiment, the case of performing game processing has been described as an example. However, the information processing is not limited to game processing. The processing of the above exemplary embodiment can be also applied to another information processing using such a display system for a virtual space as described above.

In the above exemplary embodiment, the case where a series of processing steps for performing control of separating BGM data composed of 2ch sounds into L and R channels and reproducing them on separate sound source objects is executed by a single apparatus (game apparatus body 5), has been described. However, in another exemplary embodiment, the series of processing steps may be executed in an information processing system composed of a plurality of information processing apparatuses. For example, in an information processing system including the game apparatus body 5 and a server-side apparatus capable of communicating with the game apparatus body 5 via a network, some of the series of processing steps may be executed by the server-side apparatus. Alternatively, in this information processing system, a system on the server side may be composed of a plurality of information processing apparatuses, and the processing steps to be executed on the server side may be executed being divided by the plurality of information processing apparatuses.

What is claimed is:

1. An information processing system including a processor system comprising one processor, a first loudspeaker, and a second loudspeaker, the processor system is configured to at least:
    separate predetermined music data composed of two channels into first channel music data and second channel music data;
    place a first sound source object associated with one of the first channel music data and the second channel music data, and a second sound source object associated with the other one of the first channel music data and the second channel music data, at respective different positions in a virtual 3-dimensional space;
    place a virtual microphone at a predetermined position in the virtual 3-dimensional space; and
    determine the reproduction volume of the first channel music data and the second channel music data reproduced from the first loudspeaker, and the reproduction volume of the first channel music data and the second channel music data reproduced from the second loudspeaker, based on the direction of the virtual microphone placed in the virtual 3-dimensional space and the positional relationship between the virtual microphone and each of the first sound source object and the second sound source object placed in the virtual 3-dimensional space.

2. The information processing system according to claim 1, further comprising:
    a first output apparatus having a housing provided with a motion sensor, the first loudspeaker, the second loudspeaker, and a first display on which the virtual 3-dimensional space is displayed,
    and the processor system being further configured to:
    detect the orientation of the first output apparatus based on output from the motion sensor in real time or substantially in real time; and
    change the direction of the virtual microphone in accordance with the orientation of the first output apparatus.

3. The information processing system according to claim 2, the processor system being further configured to recognize the positional relationship between the first loudspeaker and the second loudspeaker based on the orientation of the first output apparatus, wherein
    the reproduction volume of the first channel music data and the second channel music data outputted from the first loudspeaker, and the reproduction volume of the first channel music data and the second channel music data outputted from the second loudspeaker are determined based on the positional relationship between the first loudspeaker and the second loudspeaker as well as on the direction of the virtual microphone placed in the virtual 3-dimensional space and the positional relationship between the virtual microphone and each of the first sound source object and the second sound source object placed in the virtual 3-dimensional space.

4. The information processing system according to claim 2, further comprising a second output apparatus having a third loudspeaker, a fourth loudspeaker, and a second display,
    wherein the reproduction volume of each loudspeaker is determined based on the positional relationship among the first loudspeaker and the second loudspeaker of the first output apparatus, and the third loudspeaker and the fourth loudspeaker of the second output apparatus.

5. The information processing system according to claim 1, wherein
    the music data is stereo music data composed of two channels, and
    the first loudspeaker and the second loudspeaker are a pair of stereo speakers.

6. A computer-readable non-transitory storage medium having stored therein an information processing program to be executed by a computer in an information processing system that includes an information processing section, a first loudspeaker, and a second loudspeaker, the information processing program causing the computer to provide functionality comprising:
    a music data separation that separates predetermined music data composed of two channels into first channel music data and second channel music data;
    a sound source object placement that places a first sound source object associated with one of the first channel music data and the second channel music data, and a second sound source object associated with the other one of the first channel music data and the second channel music data, at respective different positions in a virtual 3-dimensional space;
    a virtual microphone placement that places a virtual microphone at a predetermined position in the virtual 3-dimensional space; and
    a sound output control that determines the reproduction volume of the first channel music data and the second channel music data reproduced from the first loudspeaker, and the reproduction volume of the first channel music data and the second channel music data reproduced from the second loudspeaker, based on the direction of the virtual microphone placed in the virtual 3-dimensional space and the positional relationship between the virtual microphone and each of the first sound source object and the second sound source object placed in the virtual 3-dimensional space.

7. The computer-readable non-transitory storage medium having stored therein the information processing program according to claim 6, wherein the information processing system further includes a first output apparatus having a housing provided with a motion sensor, the first loudspeaker, the second loudspeaker, and a first display on which the virtual 3-dimensional space is displayed, the information processing program further causing the computer to provide functionality comprising:
    an orientation detection that detects the orientation of the first output apparatus based on output from the motion sensor in real time or substantially in real time; and a virtual microphone orientation changing that changes the direction of the virtual microphone in accordance with the orientation of the first output apparatus.

8. An information processing control method for controlling an information processing system including an information processor, a first loudspeaker, and a second loudspeaker, the information processing control method comprising:
   separating predetermined music data composed of two channels into first channel music data and second channel music data;
   placing a first sound source object associated with one of the first channel music data and the second channel music data, and a second sound source object associated with the other one of the first channel music data and the second channel music data, at respective different positions in a virtual 3-dimensional space;
   placing a virtual microphone at a predetermined position in the virtual 3-dimensional space; and
   determining the reproduction volume of the first channel music data and the second channel music data reproduced from the first loudspeaker, and the reproduction volume of the first channel music data and the second channel music data reproduced from the second loudspeaker, based on the direction of the virtual microphone placed in the virtual 3-dimensional space and the positional relationship between the virtual microphone and each of the first sound source object and the second sound source object placed in the virtual 3-dimensional space.

9. The information processing control method according to claim 8, wherein the information processing system further includes a first output apparatus having a housing provided with a motion sensor, the first loudspeaker, the second loudspeaker, and a first display on which the virtual 3-dimensional space is displayed, the information processing control method further comprising:
   detecting the orientation of the first output apparatus based on output from the motion sensor in real time or substantially in real time; and
   changing the direction of the virtual microphone in accordance with the orientation of the first output apparatus.

10. An information processing apparatus including a first loudspeaker and a second loudspeaker, the information processing apparatus comprising:
   a music data separator configured to separate predetermined music data composed of two channels into first channel music data and second channel music data;
   a sound source object placer configured to place a first sound source object associated with one of the first channel music data and the second channel music data, and a second sound source object associated with the other one of the first channel music data and the second channel music data, at respective different positions in a virtual 3-dimensional space;
   a virtual microphone placer configured to place a virtual microphone at a predetermined position in the virtual 3-dimensional space; and
   a sound output controller configured to determine the reproduction volume of the first channel music data and the second channel music data reproduced from the first loudspeaker, and the reproduction volume of the first channel music data and the second channel music data reproduced from the second loudspeaker, based on the direction of the virtual microphone placed in the virtual 3-dimensional space and the positional relationship between the virtual microphone and each of the first sound source object and the second sound source object placed in the virtual 3-dimensional space.

11. The information processing apparatus according to claim 10, further comprising:
   a motion sensor;
   a first display on which the virtual 3-dimensional space is displayed;
   an orientation detector configured to detect the orientation of the information processing apparatus based on output from the motion sensor in real time or substantially in real time; and
   a virtual microphone orientation modifier configured to change the direction of the virtual microphone in accordance with the orientation of the information processing apparatus.

* * * * *